US008035075B2

(12) United States Patent
Schlam et al.

(10) Patent No.: US 8,035,075 B2
(45) Date of Patent: Oct. 11, 2011

(54) DYNAMIC INSULATED GLAZING UNIT WITH MULTIPLE SHUTTERS

(75) Inventors: Elliott Schlam, Wayside, NJ (US); Mark S. Slater, North Adams, MA (US)

(73) Assignee: New Visual Media Group, L.L.C., Eatontown, NJ (US)

( * ) Notice: Subject to any disclaimer, the term of this patent is extended or adjusted under 35 U.S.C. 154(b) by 0 days.

(21) Appl. No.: 12/655,956

(22) Filed: Jan. 11, 2010

(65) Prior Publication Data

US 2010/0172007 A1 Jul. 8, 2010

Related U.S. Application Data

(63) Continuation of application No. 11/825,363, filed on Jul. 6, 2007, now Pat. No. 7,645,977.

(60) Provisional application No. 60/859,637, filed on Nov. 17, 2006.

(51) Int. Cl.
*G01J 1/44* (2006.01)
*G02B 26/02* (2006.01)

(52) U.S. Cl. ..................... 250/214 B; 359/230; 359/290

(58) Field of Classification Search .............. 250/214 B; 359/230, 231, 601, 265, 266, 290, 291
See application file for complete search history.

(56) References Cited

U.S. PATENT DOCUMENTS

| | | | |
|---|---|---|---|
| 3,897,997 A | 8/1975 | Kalt | |
| 3,989,357 A | 11/1976 | Kalt | |
| 4,094,590 A | 6/1978 | Kalt | |
| 4,105,294 A | 8/1978 | Peck | |
| 4,208,103 A | 6/1980 | Kalt et al. | |
| 4,248,501 A | 2/1981 | Simpson | |
| 4,266,339 A | 5/1981 | Kalt | |
| 4,336,536 A | 6/1982 | Kalt et al. | |
| 4,468,663 A | 8/1984 | Kalt | |
| 4,488,784 A | 12/1984 | Kalt et al. | |
| 4,695,837 A | 9/1987 | Kalt | |
| 4,747,670 A | 5/1988 | Devio et al. | |
| 5,231,559 A | 7/1993 | Kalt et al. | |
| 5,519,565 A | 5/1996 | Kalt et al. | |
| 5,638,084 A | 6/1997 | Kalt | |
| 6,057,814 A | 5/2000 | Kalt | |
| 6,317,108 B1 | 11/2001 | Kalt | |
| 6,692,646 B2 | 2/2004 | Kalt et al. | |
| 6,771,237 B1 | 8/2004 | Kalt | |
| 6,897,786 B1 | 5/2005 | Kalt et al. | |
| 7,645,977 B2 * | 1/2010 | Schlam et al. | 250/214 B |
| 2002/0144831 A1 | 10/2002 | Kalt | |

* cited by examiner

*Primary Examiner* — Thanh X Luu
(74) *Attorney, Agent, or Firm* — Lerner, David, Littenberg, Krumholz & Mentlik, LLP

(57) ABSTRACT

An insulated glazing unit has controllable radiation transmittance. Peripheries of first and second glazing panes are attached and spaced apart facing each other and then attached to a supporting structure. A conductive layer is atop the first glazing pane inner surface as a fixed position electrode. A dielectric is atop the conductive layer. A coiled spiral roll, variable position electrode is between the first and second glazing panes, a width of its outer edge attached to the dielectric. A first electrical lead is connected to the variable position electrode's conductive layer. A second electrical lead is connected to the conductive layer atop the first glazing pane. Applied voltage between the first and second electrical leads creates a predetermined potential difference between the electrodes, and the variable position electrode unwinds and rolls out to at least partially cover the first glazing pane, at least reducing the intensity of passing radiation.

20 Claims, 6 Drawing Sheets

DYNAMIC INSULATED GLAZING UNIT WITH MULTIPLE SHUTTERS

CROSS-REFERENCE TO RELATED APPLICATIONS

This application is a continuation of U.S. patent application Ser. No. 11/825,363, filed Jul. 6, 2007 now issued as U.S. Pat. No. 7,645,977, which claims the benefit of the filing date of U.S. Provisional Application No. 60/859,637, filed Nov. 17, 2006, the disclosures of which applications are hereby incorporated by reference herein.

BACKGROUND OF THE INVENTION

The invention relates to an insulated glazing unit (IGU) and its manufacture and, more particularly, to an IGU which includes an electronic physical shutter device that controls the intensity of radiation passing through the insulated glazing unit and/or that can block the radiation passing through the insulated glazing unit.

Glass windows, skylights, doors, and the like which are used in buildings and other structures are known to waste large amounts of energy. The windows permit the infrared radiation of sunlight to pass into the interior of the building and cause unwanted heating, particularly during summer months, thus requiring increased use of air conditioning to remove the unwanted heat. The windows also permit heat to leave the interior of the building during winter months, thereby requiring additional heating of the building. The increased use of air conditioning and heating increases the costs of operating the building and causes increased consumption of petroleum products and other non-recoverable resources. The increased consumption of these resources has become particularly critical as, for example, supplies of petroleum decrease and the price of petroleum rises. Also, at the same time that this increased consumption has become critical, new constructions of residential and commercial structures incorporate more glass than was used in older constructions, thereby further increasing consumption of these non-recoverable resources.

A known method of attempting to reduce the passage of radiation through a window is to use low emissivity glass, tinted or non-tinted, commonly known as Low E glass, which typically incorporates one or more metal based coatings. During winter months, the Low E glass reduces heat loss from the building through the windows by reflecting heat back into the interior of the building. During summer months, the Low E glass reduces interior heating of the building by preventing solar radiation from passing through the windows into the building and also reduces potential damage from the solar radiation. Tinted coatings are frequently added to the Low E glass to enhance its effectiveness. Unfortunately, the use of tinted Low E glass also requires a significant and undesirable trade-off between its optical clarity and its effectiveness in reducing the passage of heat and radiation through the tinted Low E glass. Specifically, the Low E glass requires thicker coatings to more effectively conserve energy, and such thicker coatings cause less light to pass through the window.

Another known approach uses an insulated glass (IG) window that incorporates one or more functional electronic layers between the two or more sheets of glass of the IG window. The electronic layers are somewhat clear in the absence of an applied voltage and allow heat and radiation to pass. When the voltage is applied, the electronic layers darken to reduce the passage of the heat and radiation. The materials used, such as liquid crystal layers, electrophoretic layers, and/or electrochromic layers, are also used in display devices. The electrochromic layers are the materials most commonly used for such electronic layers. An example of this approach is described in U.S. Pat. No. 6,972,888, titled "Electrochromic Windows and Method of Making the Same" and issued Dec. 6, 2005 to Poll, et al., the disclosure of which is incorporated herein by reference.

Undesirably, IG windows that incorporate functional electronic layers are difficult and costly to manufacture, have a questionable operating life, have undesirable operating temperatures, have very slow response times, provide incomplete darkening, and increase power consumption by their operation.

It is therefore desirable to reduce the passage of heat and radiation through a window or the like in a manner that avoids the tradeoffs and drawbacks of the above known approaches. It is further desirable to provide a manufacturing process for such windows that can be used by traditional manufacturers of window glass, thereby adding another economic advantage to the manufacture of such windows.

SUMMARY OF THE INVENTION

According to an aspect of the invention, an insulated glazing unit has controllable radiation transmittance. A first glazing pane is attached at its periphery to a second glazing pane with a spacer separating them, the resultant assembly being attached at its periphery to a supporting structure. The first glazing pane and the second glazing pane are arranged such that an inner surface of the first glazing pane and an inner surface of the second glazing pane face each other and are spaced apart from each other. A conductive layer is disposed atop the inner surface of the first glazing pane and forms a fixed position electrode. A dielectric layer is disposed atop the conductive layer. A variable position electrode is disposed between the first glazing pane and the second glazing pane and is configured as a coiled spiral roll. An outer edge of the coiled spiral roll is attached along a width thereof to the dielectric layer. The variable position electrode includes a resilient layer and a further conductive layer. A first electrical lead is connected to the conductive layer of the variable position electrode, and a second electrical lead is connected to the conductive layer atop the inner surface of the first glazing pane. When a voltage is applied between the first electrical lead and the second electrical lead and creates a predetermined potential difference between the fixed position electrode and the variable position electrode, the variable position electrode unwinds and rolls out to cover at least part of the first glazing pane and thereby at least reduces the intensity of radiation passing through the insulated glazing unit.

In accordance with the above aspect of the invention, at least one of the first electrical lead and the second electrical lead may be connectable to an external power source. A switch may be included that is operable to apply and remove the voltage between the first electrical lead and the second electrical lead. A sensor may be incorporated that is operable to sense one or more of temperature and radiation intensity and that is operable to apply and remove the voltage between the first electrical lead and the second electrical lead based on the sensed temperature or the sensed radiation intensity.

Also in accordance with this aspect of the invention, the first glazing pane, the second glazing pane, the conductive layer, and the dielectric layer may each be substantially transparent or substantially translucent, and the variable position electrode may be substantially translucent or substantially opaque. The variable position electrode may include a color coating.

One or more of the conductive layer and the dielectric layer may be a Low E coating. The further conductive layer of the variable position electrode may include one or more of a colored layer and a reflective layer. The further conductive layer of the variable position electrode may be a metal layer, and the metal layer may be a 100 to 500 Å thick layer of aluminum. The resilient layer of the variable position electrode may be a shrinkable polymer, and the shrinkable polymer may be polyethylenenapthalate (PEN), polyethyleneterephthalate (PET), or polyphenylene sulfide (PPS). The resilient layer of the variable position electrode may have a thickness of 1 to 5 μm.

Further in accordance with this aspect of the invention, the dielectric layer may be a low dissipation factor polymer, and the low dissipation factor polymer may be polypropylene, fluorinated ethylene propylene (FEP), or polytetrafluoroethylene (PTFE). The dielectric layer may have a thickness of 4 to 10 μm. The conductive layer beneath the dielectric layer may be a substantially transparent conductor, and the substantially transparent conductor may be indium tin oxide (ITO) or tin oxide ($SnO_2$). The conductive layer beneath the dielectric layer may have a thickness of 500 to 5000 Å.

Still further in accordance with the above aspect of the invention, the outer edge of the coiled spiral roll may be attached to the dielectric layer atop a location near an edge of the first glazing pane, and the insulated glazing unit may include a locking restraint that is located near an opposing edge of the first glazing pane so that when the variable position electrode unwinds, the locking restraint prevents a portion adjoining an inner edge of the coiled spiral roll from being rolled out. The locking restraint may be comprised of a conductive material. The locking restraint may include a low dissipation factor polymer coating, and the low dissipation factor polymer coating may be polypropylene, fluorinated ethylene propylene (FEP) or polytetrafluoroethylene (PTFE). The locking restraint may be hidden from view by the supporting structure.

A controllable radiation transmittance window may include an insulated glazing unit in accordance with the above aspect of the invention. One of the first glazing pane and the second glazing pane may be an outside window pane, and the other one of the first glazing pane and the second glazing pane may be an inner window pane.

A controllable radiation transmittance window may include a plurality of insulated glazing units each in accordance with the above aspect of the invention as well as a common switch operable to apply and remove the voltage between the first electrical lead and the second electrical lead in each of the plurality of insulated glazing units.

A controllable radiation transmittance door may include an insulated glazing unit in accordance with the above aspect of the invention.

A controllable radiation transmittance skylight may include an insulated glazing unit in accordance with the above aspect of the invention.

A controllable radiation transmittance moon roof may include an insulated glazing unit in accordance with the above aspect of the invention.

A controllable radiation transmittance canopy may include an insulated glazing unit in accordance with the above aspect of the invention.

According to a method of the invention, an insulated glazing unit having controllable radiation transmittance is fabricated. A first glazing pane is provided, and a conductive material is coated onto a given surface of the first glazing pane to form a conductive layer. A dielectric material is laminated atop the conductive layer to form a dielectric layer. A layered structure is provided that includes a polymer layer and a further conductive layer. A first edge of the layered structure is attached onto a mandrel with the first edge of the layered structure extending along a width of the layered structure and being attached to the mandrel along a length of its shaft, the layered structure thereby wrapping around the mandrel. The layered structure is heated to a temperature at which the polymer layer of the layered structure shrinks and causes the layered structure to form a tightly coiled spiral roll around the mandrel. An outer edge of the coiled spiral roll is affixed along a width thereof onto the dielectric layer. A first electrical lead is connected to the conductive layer of the variable position electrode, and a second electrical lead is connected to the conductive layer atop the inner surface of the first glazing pane. A voltage is applied between the first electrical lead and the second electrical lead to create a predetermined potential difference between the fixed position and variable position electrodes so that the variable position electrode unwinds and rolls out to allow removal of the mandrel. The first glazing pane and a second glazing pane are attached at their peripheries to a supporting structure such that the given surface of the first glazing pane and a given surface of the second glazing pane face each other and are spaced apart from each other, and the variable position electrode is disposed between the first glazing pane and the second glazing pane.

In accordance with the above method of the invention, the coating step may include one or more of physical deposition and vapor deposition. The coating step may include pyrolytic spraying of the conductive material onto the surface of the first glazing pane or rf sputtering of the conductive material onto the surface of the first glazing pane. The laminating step may include preheating the first glazing pane and then passing the first glazing pane and the dielectric material through a roll laminator, and the roll laminator may include a hot shoe or a hot roller. The affixing step may include applying a line of adhesive onto the dielectric layer and then affixing the outer end of the coiled spiral roll onto the line of adhesive.

According to another method of the invention, an insulated glazing unit having controllable radiation transmittance is fabricated. A first glazing pane is provided, and a conductive material is coated onto a given surface of the first glazing pane to form a conductive layer. A dielectric material is laminated atop the conductive layer to form a dielectric layer. A layered structure is provided that includes a polymer layer and a further conductive layer. Each of the edges of the layered structure is affixed onto the dielectric layer. All but one of the edges of the layered structure are released from the dielectric layer so that the layered structure wraps around itself. The layered structure is heated to a temperature at which the polymer layer of the layered structure shrinks and causes the layered structure to form a tightly coiled spiral roll. A first electrical lead is connected to the conductive layer of the variable position electrode, and a second electrical lead is connected to the conductive layer atop the inner surface of the first glazing pane. The first glazing pane and a second glazing pane are attached at their peripheries to a supporting structure such that the given surface of the first glazing pane and a given surface of the second glazing pane face each other and are spaced apart from each other, and the variable position electrode is disposed between the first glazing pane and the second glazing pane.

In accordance with the above method of the invention, the releasing step may include cutting the layered structure using a blade, cutting the layered structure using a laser, or chemically releasing all but the one of the edges of the layered structure from the dielectric layer.

According to yet another method of the invention, an insulated glazing unit having controllable radiation transmittance is fabricated. A first glazing pane is provided, and a conductive material is coated onto a given surface of the first glazing pane to form a conductive layer. A dielectric material is laminated atop the conductive layer to form a dielectric layer, and a layered structure that includes a polymer layer and a further conductive layer is provided. A line of adhesive is applied onto the dielectric layer. A flat counter weight is placed atop the layered structure and covers the area of the layered structure. An edge of the layered structure is positioned along a width thereof onto the line of adhesive to affix the outer edge of the layered structure to the dielectric layer. The flat counter weight is removed from atop the layered structure so that the layered structure wraps around itself. The layered structure is heated to a temperature at which the polymer layer of the layered structure shrinks and causes the layered structure to form a tightly coiled spiral roll. A first electrical lead is connected to the conductive layer of the variable position electrode, and a second electrical lead is connected to the conductive layer atop the inner surface of the first glazing pane. The first glazing pane and a second glazing pane are attached at their peripheries, and the resulting assembly is then attached to a supporting structure such that the given surface of the first glazing pane and a given surface of the second glazing pane face each other and are spaced apart from each other, and the variable position electrode is disposed between the first glazing pane and the second glazing pane.

In accordance with each of the above methods of the invention, the laminating step may include laminating a low dissipation factor polymer to form the dielectric layer, and the low dissipation factor polymer may be polypropylene, fluorinated ethylene propylene (FEP), polytetrafluoroethylene (PTFE), or other low dissipation polymers. The laminating step may form a dielectric layer having a thickness of 4 to 10 μm. The coating step may include coating a substantially transparent conductor to form the conductive layer, and the substantially transparent conductor may be indium tin oxide (ITO), tin oxide ($SnO_2$), or zinc oxide (ZnO). The coating step may form a conductive layer having a thickness of 500 to 5000 Å.

Further in accordance with each of the above methods of the invention, the step of providing a layered structure may include providing a color coating. The step of providing a layered structure may include providing a 100 to 500 Å thick metal layer as the further conductive layer, and the metal layer may be aluminum. The step of providing a layered structure may include providing a shrinkable polymer as the resilient layer, and the shrinkable polymer may be polyethylenenapthalate (PEN) or polyethyleneterephthalate (PET). The step of providing a layered structure may include providing a resilient layer having a thickness of 1 to 5 μm. At least one of the conductive material and the dielectric material may be a tinted or non-tinted Low E material.

The foregoing aspects, features and advantages of the present invention will be further appreciated when considered with reference to the following detailed description and accompanying drawings.

BRIEF DESCRIPTION OF THE DRAWINGS

FIGS. 5*a*-5*b* depict shutters extending along the entire width but not length of an IGU and entire length but not width of an IGU, and entire length but not width of an IGU, respectively. FIGS. 5*a*-5*f* depict shutters with non-linear borders. FIGS. 5*c*-5*g* depict an IGU where the framed area includes a curved periphery.

DETAILED DESCRIPTION

Figure 1:
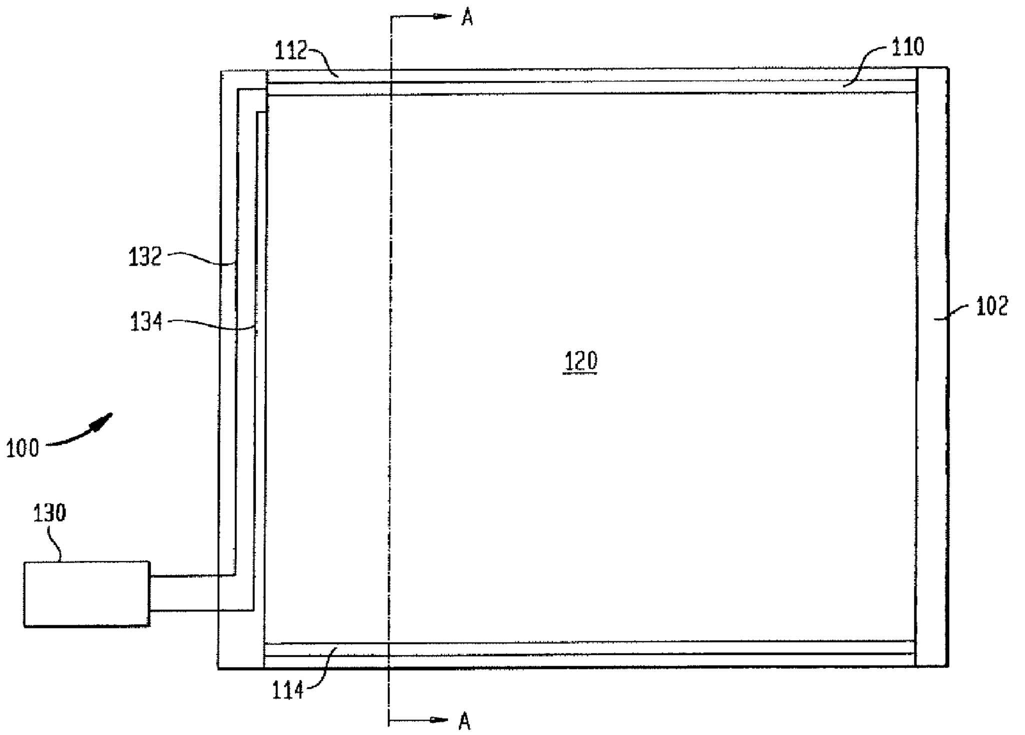
FIG. 1 is a diagram showing a front (or rear) view of an insulated glazing unit (IGU) that includes an electropolymeric shutter according to an embodiment of the invention and depicting the shutter in a rolled-up state.

The present invention overcomes the disadvantages of existing insulated glazing units (IGUs), such as are used currently in energy efficient windows, by incorporating an electrically controlled, extremely thin physical electropolymeric shutter between the glazing panes of the IGU. The electropolymeric shutter of the invention provides improvements in functionality, reliability and manufacturability over known electropolymeric shutter devices, for example, in the display pixels of existing electropolymeric display (EPD) technology, specifically by providing the glazing applications such as are described herein. Known shutter devices are described in U.S. Pat. No. 4,266,339 (titled "Method for Making Rolling Electrode for Electrostatic Device" and issued May 12, 1981 to Charles G. Kalt), U.S. Pat. No. 5,231,559 (titled "Full Color Light Modulating Capacitor" and issued Jul. 27, 1993 to Kalt, et al.), U.S. Pat. No. 5,519,565 (titled "Electromagnetic-Wave Modulating, Movable Electrode, Capacitor Elements" and issued May 21, 1996 to Kalt, et al.), U.S. Pat. No. 5,638,084 (titled "Lighting-Independent Color Video Display" and issued Jun. 10, 1994 to Kalt), U.S. Pat. No. 6,771,237 (titled "Variable Configuration Video Displays And Their Manufacture" and issued Aug. 3, 2004 to Kalt), and U.S. Pat. No. 6,692,646 (titled "Method of Manufacturing a Light Modulating Capacitor Array and Product" and issued Feb. 17, 2004 to Kalt, et al.), the disclosures of which are incorporated herein by reference.

The shutter is normally rolled up, but when an appropriate voltage is applied, the shutter rapidly rolls out to cover the entire glazing pane much like, for example, a traditional window shade. The rolled up shutter can have a very small diameter, which may be much smaller than the width of the space between the glazing panes, so that it can function between the panes and is essentially hidden when rolled up. The rolled out shutter adheres strongly to the window pane.

The electropolymeric shutter is preferably formed of an inexpensive polymer material. The polymer material is preferably coated with a reflective, conductive material and optionally coated with a colored material. By varying the thicknesses of the coatings, the shutter can be produced either to essentially fully block visible and/or infrared light or to partially block such light.

In an example of the invention, an electropolymeric shutter blocks essentially 100% of all impinging radiation and heat, thereby increasing the energy efficiency of the IGU over known approaches. Also preferably, the electropolymeric shutter is hidden from view when rolled up, thereby providing a higher quality IGU suitable for a window, door or skylight.

Preferably, the electropolymeric shutter of the invention lasts for many millions of roll outs and roll ups, thereby providing an operating life that is at least as long as that of the window, door or skylight in which the IOU of the invention may be used. Also, the shutter preferably rolls out and then rolls back up at extremely fast speeds, adding to its effectiveness when the IOU of the invention is used to provide energy efficiency and/or for privacy. Further, the electropolymeric shutter of the invention is simple to construct and preferably uses available, commodity-like materials which greatly reduces its manufacturing costs and greatly simplifies its manufacturing processes. As a result, the electropolymeric shutter of the invention may be manufactured at the same facility where a window, door or skylight IGU is manufactured.

Figure 2C:
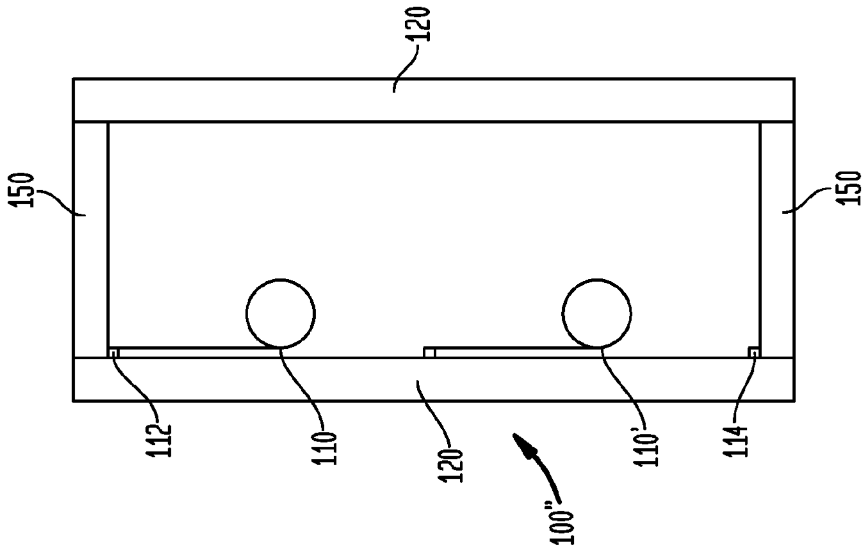
FIG. 2*c* is a diagram showing a cross-sectional view of an IGU of the type shown in FIG. 1 but depicting a pair of electropolymeric shutters in partially rolled-up states according to a further embodiment of the invention.
Figure 2B:
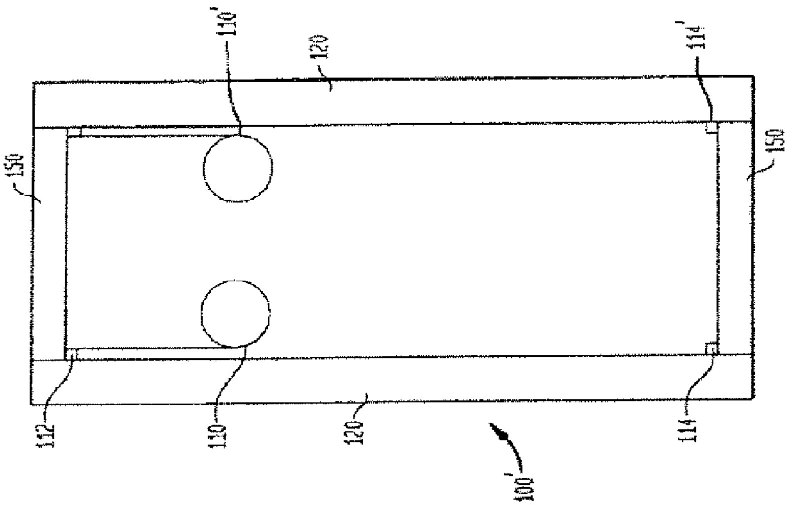
FIG. 2*b* is a diagram showing a cross-sectional view of an IGU of the type shown in FIG. 1 but depicting a pair of electropolymeric shutters in partially rolled-up states according to a further embodiment of the invention.
Figure 2A:
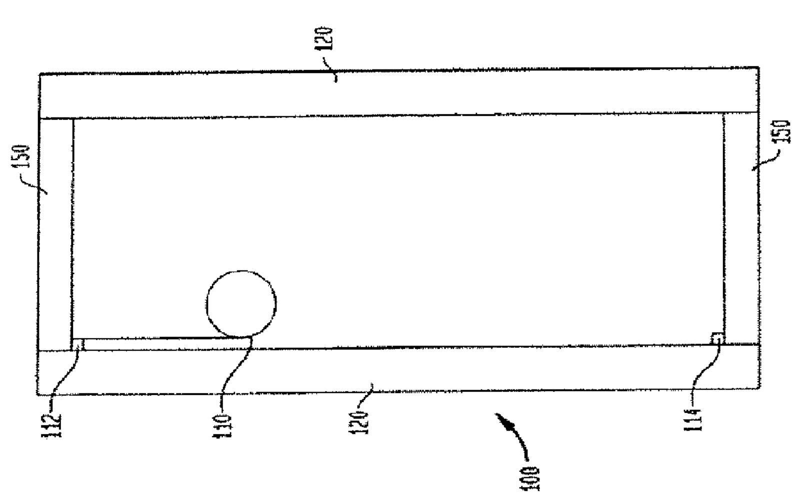
FIG. 2*a* is a diagram showing a cross-sectional view of the insulated glazing unit (IGU) of FIG. 1 taken along line A-A and depicting the electropolymeric shutter in a partially rolled out state.

An embodiment of an insulated glazing unit (ICU) 100 of the invention is shown in FIGS. 1 and 2*a*. FIG. 1 shows a front (or rear) view of the ICU 100, and FIG. 2*a* shows a cross-sectional, side view of the IGU 100 taken along line A-A of FIG. 1.

The insulated glazing unit 100 includes first and second glazing panes 120 which are attached at their periphery with a spacer 150 in-between them around their periphery. A support structure 102 surrounds the resulting first and second glazing pane assembly and is attached to the assembly at the periphery. The first and second glazing panes 120 are preferably made of a standard glass, such as is currently used for residential or commercial glazing applications, but alternatively may be comprised of any other known other rigid or flexible material such as polycarbonate, acrylic, glass reinforced polyester, or tempered glass. Any conventional or non-conventional thickness of glazing pane may be used, and the thicknesses of the two glazing panes do not need to be the same. Also, the support structure 102 may part of, for example, a window frame, door, skylight, moon roof, or canopy, but is not limited to only such applications.

An electropolymeric shutter 110 is disposed between the first and second glazing panes 120 and, preferably, is attached at one end to an inner surface of one of the first and second glazing panes 120 near the top of the support structure 102 by an adhesive layer 112. The electropolymeric shutter 110 is shown fully rolled up in FIG. 1 and is shown partially rolled out in FIG. 2*a*, FIG. 1 shows an exposed electropolymeric shutter 110 and adhesive layer 112 for illustrative purposes. However, in most applications, the electropolymeric shutter 110 and the adhesive layer 112 are usually hidden by part of the support structure 102 so that the electropolymeric shutter is only seen when at least partially rolled out.

The diameter of a fully rolled up electropolymeric shutter is preferably about 1 to 5 mm but may be greater than 5 mm. However, for the electropolymeric shutter to quickly and repeatedly roll out and roll up, the diameter of the rolled up shutter should be no greater than the size of the space between the two glazing panes, which is typically about one-half inch.

A power supply 130 is provided that drives the electropolymeric shutter and is electrically connected to the shutter by lead 132 as well as to one of the glazing panes by lead 134. Though the leads 132,134 are visible in the FIG. 1 for illustrative purposes, they are preferably hidden from view by the support structure 102. The power supply 130 is preferably a simple compact structure that can be unobtrusively placed in a convenient location associated with the IGU and, optionally, also hidden from view. For example, the power supply may be a device structure about the size of a deck of cards or smaller. The power supply is preferably capable of providing an output voltage in the range of 100 to 500 V DC and may driven by an external AC or DC power supply or by a DC battery. However, a higher or lower output voltage may be needed depending on the fabrication parameters and materials that comprise the shutter and the layers of the glazing pane.

Preferably, the electropolymeric shutter 110 is in a rolled up state in the absence of an applied voltage, and rolls out when a voltage is applied, and rolls up again when the applied voltage is removed.

The manner in which the power supply 130 is controlled generally depends on the type of application in which the IGU is used. A manual on-off switch may be used to control the power supply and thus control the shutter. Alternatively, the power supply may be configured to be remotely controlled, such as by receiving infra-red, radio, microwave or other signals generated by a hand-held remote controller, to allow for remote operation of the shutter. A single switch may control only one IGU or may control a group of IGUs, such as all of the IGUs in a room or all of the IGUs along a given wall in a room. Further, the power supply may be configured to incorporate a processor and a network interface that would enable the shutter to be controlled from another location in a building, such as by a personal computer (PC) or the like using either a hard wired or wireless local network, or from another location, such as by an Internet connection over a telephone network, cellular network, cable network, etc.

The power supply 130 may include a radiation or heat sensor that controls the supply of voltage to the shutter and which may used in place of, or in combination with, the manually-controlled or remotely-controlled switch. Such a sensor can be configured to cause the shutter to roll out when a predetermined intensity level of solar radiation impinges on the IGU or to cause the shutter to roll up when the intensity level of the solar radiation impinging on the IGU drops below a predetermined level. Alternatively, the sensor may be configured to cause the shutter to roll out to either retain internal heat or prevent internal heating based on whether the room temperature or the outside temperature is above or below a predetermined value, or the sensor may be configured to roll up based on reached such a predetermined temperature value. Moreover, the sensor may be configured to cause the shutter to roll out or roll up based on a combination of the intensity of solar radiation and a measured temperature. An example of a known electrical control system for controlling variable transmittance windows is described in U.S. Pat. No. 7,085,609, titled "Variable Transmission Window Constructions" and issued Aug. 1, 2006 to Bechtel, et al., the disclosure of which is incorporated herein by reference.

Figure 6:
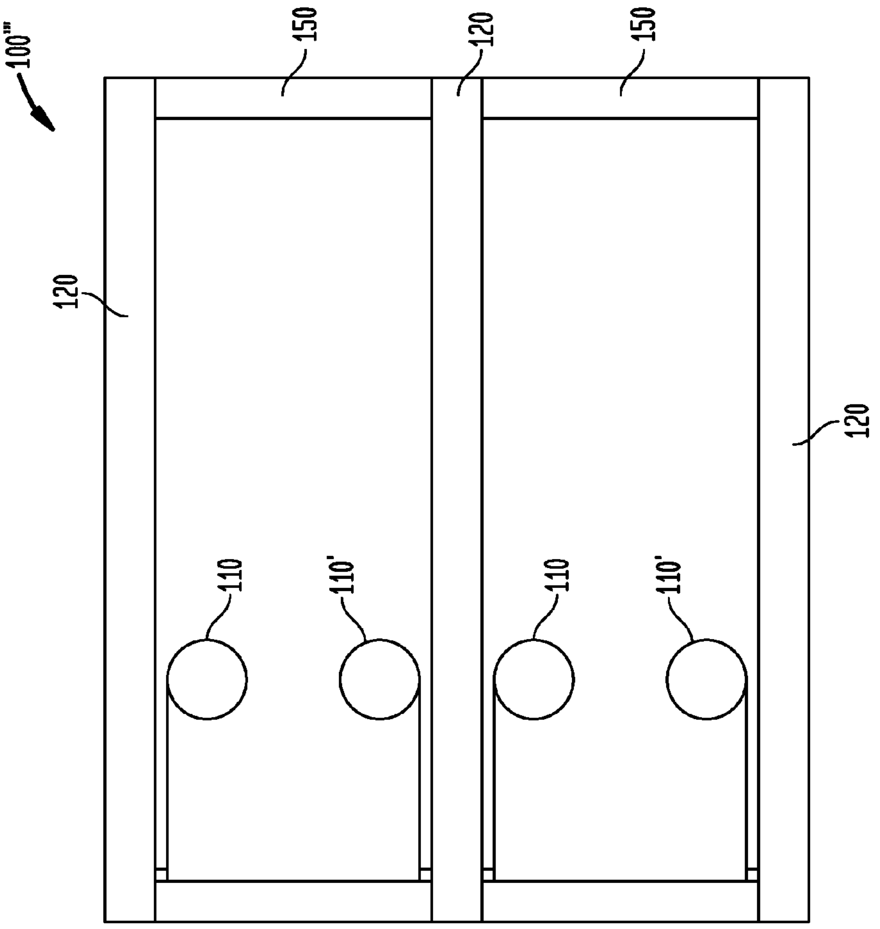
FIG. 6 depicts a diagram showing an IGU with multiple glazing panes and multiple electropolymeric shutters.
Figure 5G:
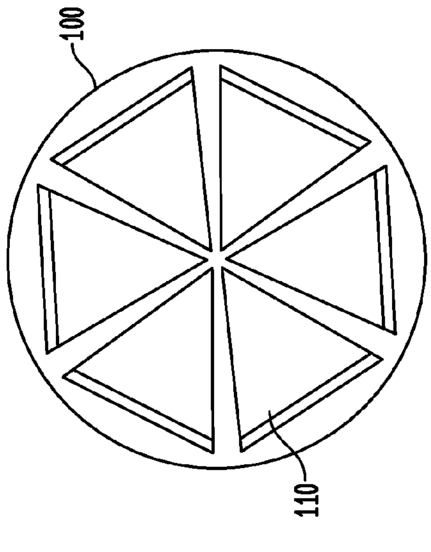

Though the FIGS. 1 and 2*a* show a single electropolymeric shutter that rolls out to cover an entire glazing pane, other configurations may be used in which the IGU is comprised of more than one electropolymeric shutter (for example as shown in FIGS. 2*b*-2*c*, 5*a*-5*d*, 5F-5G, and 6) and/or more than one glazing panes (for example as shown in FIGS. 2*b* and 6). As an example, the IGU may be formed of multiple glazing panes each of which has a respective electropolymeric shutter attached thereto 110, 110' attached thereto, as shown in FIG. 2*b* depicting IGU 100',or FIG. 2*c*, with additional shutter 110". Alternatively, the IGU may employ only a single glazing pane to which is attached multiple electropolymeric shutters which, when all of the shutters are rolled out, may completely cover the glazing pane. When multiple electropolymeric shutters are employed, the shutters may be controlled to act in unison, such as to provide the appearance of a single shutter, or the shutters may be individually controlled to roll out according to a predetermined pattern, such as by rolling out only the uppermost shutters.

Also, the glazing panes and the IGU are each shown in FIGS. 1 and 2*a* as being rectangular or square shaped. However, other shapes for the IGU and/or the glazing panes are also possible depending on the specific application of the IGU, as shown in FIGS. 5*c*-5*g*. In such applications, one or more electropolymeric shutters may be used and configured to cover either part or all of the glazing pane when rolled out. As an example, for windows with curved edges, the curved periphery can be covered by piecing together more than one electropolymeric shutter such as shown in FIGS. 5*c*-5*d* and 5*f*-5*g*.

A locking restraint 114 is disposed at the bottom of the IGU 100 along its width and serves to prevent any unfurled portion of the electropolymeric shutter from contacting the glazing pane when the shutter is rolled out. Though the locking restraint 114 is visible in FIGS. 1 and 2*a* for illustrative purposes as well as 114' in FIG. 2*b*), it is preferably hidden behind the bottom of the support structure 102. The locking restraint is preferably constructed of a conductive material, such as a metal or the like. The locking restraint may also be coated with a low dissipation factor polymer, such as polypropylene, fluorinated ethylene propylene (FEP) or polytetrafluoroethylene (PTFE).

Figure 3:
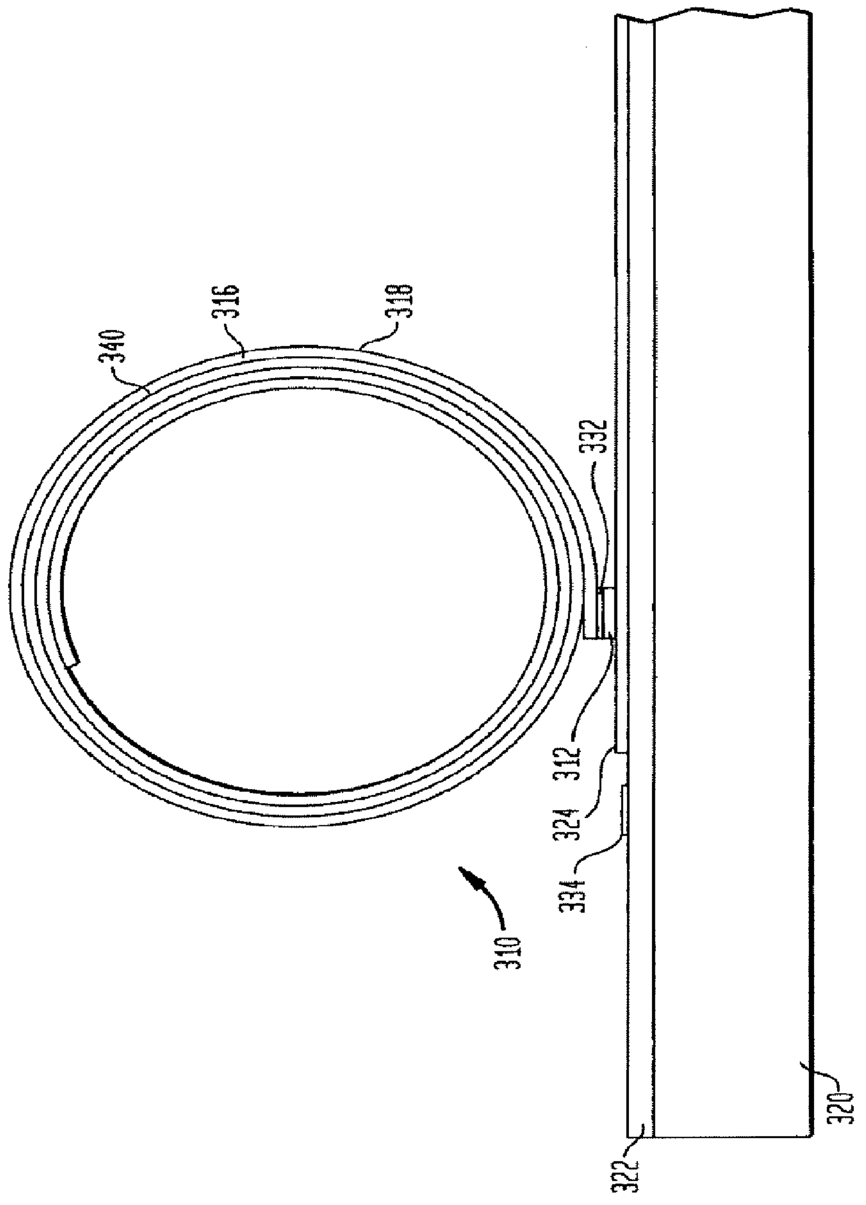
FIG. 3 is a diagram showing, in detail, a side view of an electropolymeric shutter attached to a glazing pane according to an embodiment of the invention and depicting the shutter in a rolled-up state.
Figure 4:
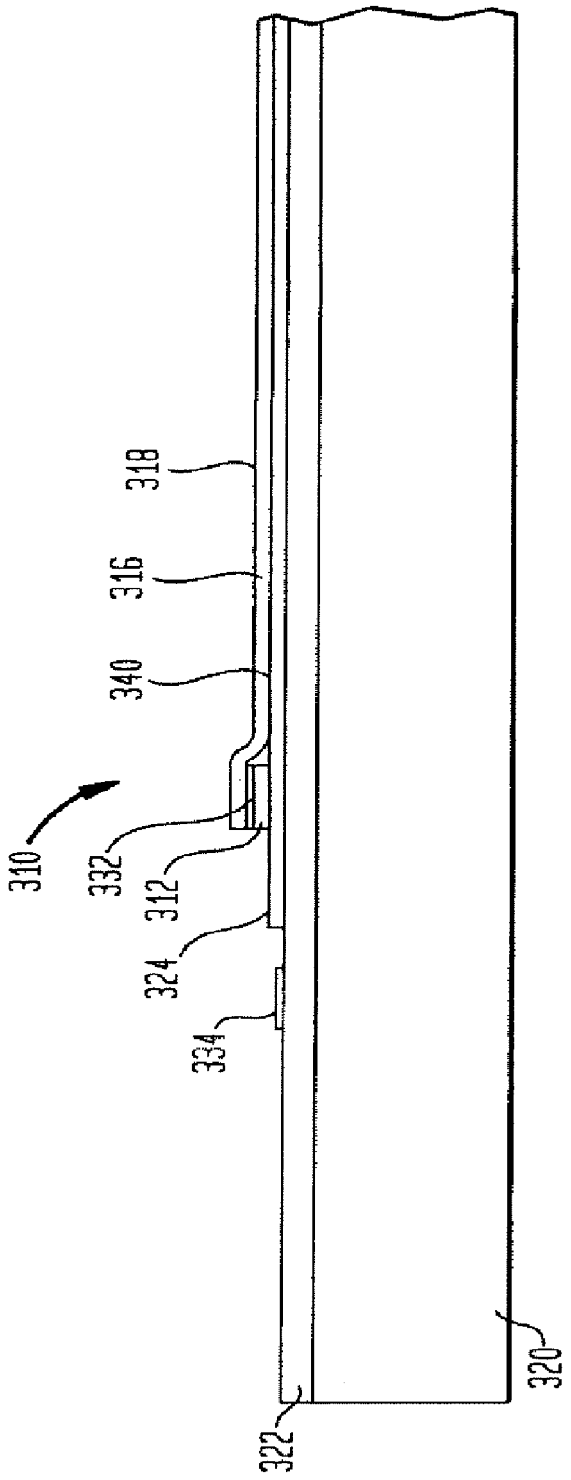
FIG. 4 is a diagram showing the electropolymeric shutter of FIG. 3 in a rolled out state.
Figure 5A:
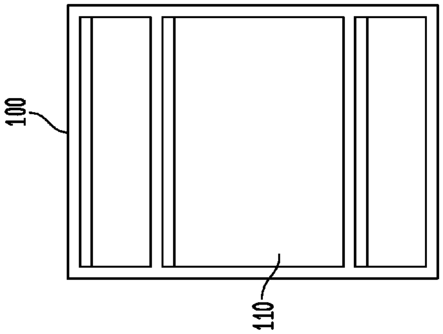
FIGS. 5*a*-5*g* depict diagrams of IGU shutter configurations.
Figure 5B:
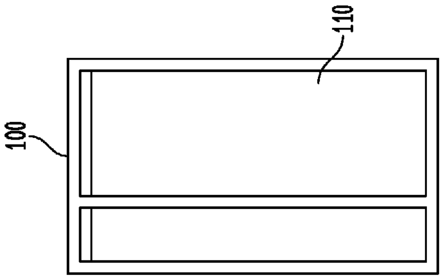
Figure 5C:
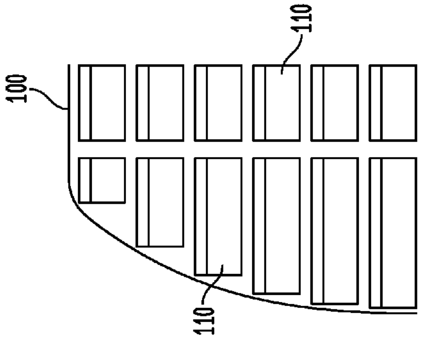
Figure 5D:
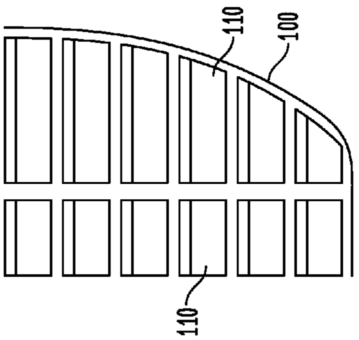
Figure 5E:
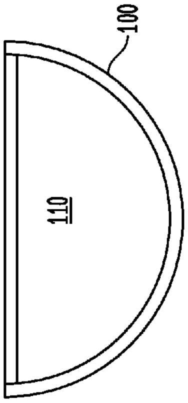
Figure 5F:
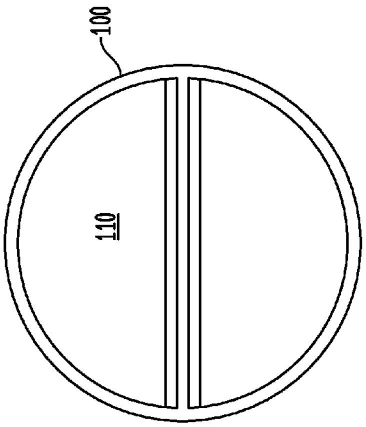

An embodiment of an electropolymeric shutter 310 of the invention and its operation are depicted in greater detail in FIGS. 3 and 4. FIG. 3 shows a side view of the electropolymeric shutter 310 in its rolled up state and also shows a portion of a glazing pane 320 of an IGU of the invention. FIG. 4 illustrates the electropolymeric shutter 310 and the glazing pane 320 in side view when the electropolymeric shutter is at least partially rolled out.

The glazing pane 320 is covered with a conductive layer 322 upon which is provided a dielectric layer 324. Both the conductive material and the dielectric material are preferably transparent. The conductive layer 322 is electrically connected via a terminal 334 to, for example, the lead 134 of FIG. 1 and serves as a fixed electrode of a capacitor. The dielectric layer 324 serves as the dielectric of this capacitor.

The conductive layer 322 is typically a transparent conductor and, preferably, is a commonly available conductive material such as is used in the flat panel display industry. Among the transparent conductors used are indium tin oxide (ITO) and tin oxide ($SnO_2$), though other similar materials may alternatively be used. Preferably, the conductive layer 322 is about 500 to 5000 Å thick, though other thicknesses may be used depending on the conductor chosen for the conductive material and the desired application. Though examples of a transparent conductor are provided, a translucent conductor or other type conductor could be employed as the conductive layer.

The dielectric layer 324 is typically a transparent dielectric material, though a translucent dielectric material may alternatively be used. Preferably, the transparent dielectric material is a low dissipation factor polymer. Such commonly available polymers include polypropylene, fluorinated ethylene propylene (FEP), and polytetrafluoroethylene (PTFE), though other polymers may be used. Preferably, the thickness of the dielectric layer is about 4 to 10 μm, though other thicknesses may be used depending on the material chosen for the dielectric layer and the desired application. However, thinner dielectric layers typically reduce the reliability of the shutter whereas thicker dielectric layers typically require a too high applied voltage.

A low emissivity (low E) coating may also be provided for the glazing pane 320. Because many Low E coatings are conductive, such Low E coatings may be used in place of the conductive layer 322. Furthermore, some Low E coatings incorporate a silver material within a protective matrix and thus are insulators that may utilized as the dielectric layer 324. Moreover, other Low E coatings use a protective overcoat atop a silver layer and may be substituted for both the conductive layer 322 and the dielectric layer 324, thereby reducing the cost of manufacturing the IGU of the invention. Additionally, the standard processes used for manufacturing Low E coatings are able to accommodate a wide range of acceptable conductivities and are thus especially suitable for providing a Low E coating as the conductive layer.

The electropolymeric shutter 310 includes a resilient layer 316 upon which is disposed another conductive layer 318. The resilient layer 316 is preferably formed from a shrinkable polymer such as polyethylenenapthalate (PEN) or polyethyleneterephthalate (PET), though other shrinkable polymers may be used. The polymer used for the resilient layer is preferably about 1 to 5 μm thick, but other thicknesses may be employed according to the polymer chosen and the intended application. However, thinner resilient layers typically reduce the reliability of the shutter whereas thicker resilient layers typically require higher applied voltages.

The conductive layer 318 may be made of a metal or a conducting non-metal and may be made to be reflective, so that the shutter essentially blocks the sun's visible and/or near visible radiation when rolled out, or made to partially block the sun's radiation. To provide a reflective or mirror appearance, the conductive layer 318 is preferably a reflective metal such as aluminum and is preferably about 100 to 500 Å thick, though a layer having a different thickness may be used based on the intended application. The preferred thickness range provides the most desired transmission variation. Thicknesses outside that range typically reduce the reliability of the electropolymeric shutter.

An optional coloring material 340 may be provided as a coating on the electropolymeric shutter. The coloring material may be used to give the shutter the appearance of a traditional window shade by employing a decorator color coating. Preferably, the reflective layer faces the outside of the window and the colored layer faces inside.

As FIG. 3 shows, the electropolymeric shutter 310 is ordinarily coiled as a spiral roll with the outer end of the spiral affixed by an adhesive layer 312 to the dielectric material 324 atop the glazing pane 320. The conductive layer 318 is electrically connected via a terminal 332 to, for example, the lead 132 of FIG. 1 and serves as a variable electrode of a capacitor having the conductive material 322 as its fixed electrode and the dielectric material 324 as its dielectric.

When a voltage difference is provided between the variable electrode and the fixed electrode, namely, when a voltage is applied across the conductive layer 318 of the electropolymeric shutter 310 and the conductive material 322 above the glazing pane 320, the variable electrode is pulled toward the fixed electrode by an electrostatic force created by the potential difference between the two electrodes. The pull on the variable electrode causes the coiled shutter to roll out, as FIG. 4 shows. The electrostatic force on the variable electrode causes the electropolymeric shutter to be held securely against the fixed electrode of the glazing pane. As a result, when the electropolymeric shutter includes a reflective layer, for example, the rolled out electropolymeric shutter prevents light or other radiation from passing through the IGU and thereby changes the overall function of the IGU from being transmissive to being reflective.

When the voltage difference between the variable electrode and the fixed electrode is removed, the electrostatic force on the variable electrode is likewise removed. The spring constant present in the resilient layer 316 of the electropolymeric shutter 310 causes the shutter to roll up back to its original, tightly wound position. Because movement of the electropolymeric shutter is controlled by a primarily capacitive circuit, current essentially only flows while the shutter is either rolling out or rolling up. As a result, the average power consumption of the electropolymeric shutter is extremely low.

The fabrication of the electropolymeric shutter of the invention and its assembly within an IGU is preferably carried out in a manner that ensures good adhesion between the electropolymeric shutter and the glazing unit, avoids wrinkles in the layers of the electropolymeric shutter, and provides an overall smooth appearance when the electropolymeric shutter is rolled out. The shutter is also preferably fabricated and assembled within the IGU in a manner that allows the shutter to operate reliably when rolled out or rolled up and to reliably repeat these operations numerous times. It is thus desirable to provide such methods of fabrication and assembly, and three such novel methods are now described.

A first method of the invention uses a mandrel in a novel manner to form the electropolymeric shutter and attach it to a glazing pane.

A glazing pane is prepared to receive the electropolymeric shutter. The glazing pane is first coated with a transparent conductor. The coating step may be carried out in a known manner, such as by pyrolytic spraying of conductive material onto a surface of the glazing pane or by rf sputtering of the conductive material onto the surface of the glazing pane. This coating may be the functional layer of a Low E glazing. Next, a dielectric layer is then formed atop the transparent conductor. Preferably, the dielectric layer, such as a low dissipation factor polymer, is laminated to the glazing pane without using any adhesive so that the glazing pane remains essentially clear. When polypropylene is used as a low dissipation factor polymer for the dielectric layer, a polypropylene layer is laminated to the glazing pane by first preheating the glazing pane and then passing the glazing pane and the polypropylene layer together through a roll laminator that uses a hot shoe or, preferably, a hot roller. Alternatively, when fluorinated ethylene propylene (FEP) or polytetrafluoroethylene (PTFE) is used as a low dissipation factor polymer for the dielectric layer, an FEP or PTFE layer is laminated to the glazing pane by pressing the FEP or PTFE layer onto the glazing pane in an air tight manner and then heating the FEP or PTFE layer and the glazing pane until the FEP or PTFE softens and adheres to the glazing pane.

The electropolymeric shutter is fabricated using a layered structure formed of at least a polymer layer and a conductive layer as described above. The layered structure is first held along its width edge to the length of the shaft of the mandrel to which it naturally grabs onto because of its curl. The mandrel and the held layered structure are then heated to at least a temperature at which the polymer layer of the layered structure is caused to shrink. The conductive layer of the layered structure, however, does not shrink as the polymer layer shrinks so that the layered structure is pulled by the shrinking polymer layer in a manner that causes the layered structure to more firmly coil around the mandrel and thereby form a tightly coiled spiral roll. A line of adhesive is next applied to the dielectric layer atop the glazing pane, and then the outer width edge of the layered structure is affixed to the dielectric layer atop the glazing pane. Next, the electrical contacts or leads are electrically connected to the conductive layer of the layered structure and to the transparent conductor, and a voltage is applied to the two electrical leads to cause the layered structure to roll out and release the mandrel.

The glazing pane is then attached at its periphery to another glazing pane with the intervening spacer, and sealed with the electrical leads passing through the seal. The resulting glazing assembly is then affixed to the supporting structure. The electrical lead to the conductive layer of the layered structure and the electrical lead to the conductive layer atop the glazing pane are then traced along the inside of the supporting structure, such as behind the top and side portions of the supporting structure, to an internally-located power supply or through an opening in the supporting structure to an externally-located power supply. The supporting structure is assembled within the overall window frame. The contacts are configured in a manner such that electrical contact with the leads is maintained even if the glazing pane and its supporting structure is moved within the window frame. Incorporating a metallic (conducting) structure in the supporting structure and window frame facilitates the electrical contact.

Another method of fabricating the electropolymeric shutter avoids using a mandrel. A glazing pane is coated with a conductive layer and is laminated with a dielectric layer in the manner described above. An adhesive is next applied atop the dielectric layer along each of the edges of the glazing pane to have a "picture frame" shape on the glazing pane. A pre-stretched layered structure, formed of at least a polymer layer and another conductive layer, is provided as described previously, and all edges of the layered structure are then adhered to the dielectric layer atop the glazing pane. The layered structure is then released along all but one of its edges so that the pre-stretched layered structure naturally curls around itself in a manner similar to that described regarding the above method. The edges of the layered structure are preferably released by cutting the layered structure using a blade or a laser. Optionally, a sacrificial layer is provided between the layered structure and the dielectric layer to avoid damaging the dielectric layer while cutting the layered structure. Alternatively, the edges of the layered structure are chemically released from the dielectric layer.

The layered structure and the glazing pane are then heated in a manner similar to that described previously so that the polymer layer shrinks and causes the layered structure to more firmly coil around itself and form the tightly coiled spiral roll. The other glazing pane, electrical leads and supporting structure are then assembled in the manner described above to complete the IGU.

A further method of fabricating the electropolymeric shutter uses a flat counter weight that is preferably the same length and width as the electropolymeric shutter. A conductive layer is coated atop the glazing pane, and a dielectric layer is laminated atop the glazing pane, both in the manner described regarding the first method. A line of adhesive is then applied along one edge of the dielectric layer. The flat counter weight is placed atop the layered structure to cover at least the area of the layered structure, and a width edge of the layered structure is positioned onto the line of adhesive to affix the edge of the layered structure to the dielectric layer. The flat counter weight is then removed so that the layered structure wraps around itself, and the layered structure and the glazing pane are heated as described above to form the tightly coiled spiral roll of the electropolymeric shutter. The remaining steps are carried out as set out above.

In addition to the three related methods described above, variations of these methods are also possible within the scope of the invention.

The incorporation of the electropolymeric shutter within an IGU according to the invention provides an IGU having improved energy efficiency. Additionally, the electropolymeric shutter and IGU of the invention may be used for various privacy applications by modifying the thickness of its conductive layer and/or the thickness of any coloring material used so that the IGU becomes translucent or fully opaque when the electropolymeric shutter rolls out.

The electropolymeric shutter and IOU of the invention may be used in any one of numerous applications in which IGUs are ordinarily used or in which controllable privacy is desired. The electropolymeric shutter and IGU of the invention may be used as an outside facing window, as an internally located window such as along a conference room, as a thermal door that is exposed to the outside, or as an optically clear door used inside. Moreover, the electropolymeric shutter and IGU of the invention may be incorporated into a skylight or other such window-like overhead structures used in a residential, commercial, or industrial building. Additionally, the electropolymeric shutter and IOU of the invention may be used in a motor vehicle, such as to provide a moon roof or the like, may be used in a commercial, industrial or military ground or sea vehicle, or may be used in an aircraft.

Also, the structure of the electropolymeric shutter and IGU of the invention and the manufacturing methods of the invention that are described above may be readily be varied to accommodate other possible applications that require simple changes without departing from the scope of the invention. The underlying principles of the invention remain the same in such applications.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An insulated glazing unit having controllable radiation transmittance, said insulated glazing unit comprising:

a spacer defining a framed area capable of allowing radiation transmission therethrough;

a first glazing pane attached to said spacer;

a second glazing pane attached to said spacer, said glazing panes arranged such that an inner surface of said first glazing pane and an inner surface of said second glazing pane face each other and are spaced apart from each other;

a conductive layer disposed on said inner surface of said first glazing pane;

a dielectric layer disposed on said conductive layer;

a first shutter having a resilient layer and a further conductive layer, said further conductive layer in contact with said dielectric layer, said first shutter having a width extending substantially across the entire width of the framed area, said first shutter adapted to extend along the length of the framed area from a contracted configuration covering a portion of the framed area to an expanded configuration covering a greater portion of the framed area;

whereby, when a voltage is applied between said conductive layer and said further conductive layer a potential difference between said conductive layer and said further conductive layer causes said first shutter to expand from said contracted configuration to said expanded configuration to control radiation transmittance through said insulated glazing unit a second shutter, said second shutter having a resilient layer and a further conductive layer in contact with said dielectric layer, said second shutter adapted to extend along at least a portion of the length of the framed area from a contracted configuration covering a second portion of the framed area to an expanded configuration covering a greater second portion of the framed area, the greater portion of the framed area covered by the second shutter being different than the greater second portion of the framed area covered by the first shutter;

whereby, when a voltage is applied between said conductive layer and said further conductive layer of said second shutter, a potential difference between said conductive layer and said further conductive layer of said second shutter causes said second shutter to expand from said contracted configuration to said expanded configuration to control radiation transmittance through said insulated glazing unit.

2. The insulating glazing unit of claim 1, wherein said first shutter and said second shutter have different widths.

3. The insulating glazing unit of claim 1, wherein said first shutter and said second shutter have different lengths.

4. The insulating glazing unit of claim 1, wherein said first shutter and said second shutter each have at least one border which is non-linear and said framed area includes a curved periphery, at least a portion of said first shutter and a portion of said second shutter matching at least a portion of said curved periphery of said insulating glazing unit.

5. The insulating glazing unit of claim 1, wherein said first shutter has at least one border which is non-linear.

6. The insulating glazing unit of claim 5, wherein said framed area includes a curved periphery.

7. The insulating glazing unit of claim 6, wherein at least a portion of said first shutter has a periphery which matches at least a portion of said curved periphery of said insulating glazing unit.

8. The insulating glazing unit of claim 1, further comprising a plurality of additional shutters, said plurality of additional shutters each having a resilient layer and a further conductive layer in contact with said dielectric layer, each of said plurality of additional shutters having a contracted configuration covering an additional portion of the framed area and an expanded configuration covering a greater additional portion of the framed area;

whereby, when a voltage is applied between said conductive layer and said further conductive layer of each of said additional shutters, a potential difference between said conductive layer and said further conductive layers of each of said plurality of shutters causes said shutters to expand from said contracted configurations to said expanded configurations to control radiation transmittance through said insulated glazing unit.

9. The insulating glazing unit of claim 1, wherein said greater portion is substantially said entire framed area.

10. The insulating glazing unit of claim 1, wherein said first glazing pane is either plastic or glass and said second glazing pane is either plastic or glass.

11. An insulated glazing unit having controllable radiation transmittance, said insulated glazing unit comprising:

a spacer defining a framed area capable of allowing radiation transmission therethrough;

a first glazing pane attached to said spacer;

a second glazing pane attached to said spacer, said glazing panes arranged such that an inner surface of said first glazing pane and an inner surface of said second glazing pane face each other and are spaced apart from each other;

a conductive layer disposed on said inner surface of said first glazing pane;

a dielectric layer disposed on said conductive layer;

a first shutter having a resilient layer and a further conductive layer, said further conductive layer in contact with said dielectric layer, said first shutter having a length extending substantially along the entire length of the framed area, said first shutter adapted to extend along the width of the framed area from a contracted configuration covering a portion of the framed area to an expanded configuration covering a greater portion of the framed area;

whereby, when a voltage is applied between said conductive layer and said further conductive layer a potential difference between said conductive layer and said further conductive layer causes said first shutter to expand from said contracted configuration to said expanded configuration to control radiation transmittance through said insulated glazing unit a second shutter, said second shutter having a resilient layer and a further conductive layer in contact with said dielectric layer, said second shutter adapted to extend along at least a portion of the width of the framed area from a contracted configuration covering a second portion of the framed area to an expanded configuration covering a greater second portion of the framed area, the greater second portion of the framed area covered by the second shutter being different than the greater portion of the framed area covered by the first shutter;

whereby, when a voltage is applied between said conductive layer and said further conductive layer of said second shutter, a potential difference between said conductive layer and said further conductive layer of said second shutter causes said second shutter to expand from said contracted configuration to said expanded configuration to control radiation transmittance through said insulated glazing unit.

12. The insulating glazing unit of claim 11, wherein said first shutter and said second shutter have different widths.

13. The insulating glazing unit of claim 11, wherein said first shutter and said second shutter have different lengths.

14. The insulating glazing unit of claim 11, wherein said first shutter and said second shutter each have at least one border which is non-linear and said framed area includes a curved periphery, at least a portion of said first shutter and a portion of said second shutter matching at least a portion of said curved periphery of said insulating glazing unit.

15. The insulating glazing unit of claim 11, wherein said first shutter has at least one border which is non-linear.

16. The insulating glazing unit of claim 15, wherein said framed area includes a curved periphery.

17. The insulating glazing unit of claim 16, wherein at least a portion of said first shutter has a periphery which matches at least a portion of said curved periphery of said insulating glazing unit.

18. The insulating glazing unit of claim 11, further comprising a plurality of additional shutters, said plurality of additional shutters each having a resilient layer and a further conductive layer in contact with said dielectric layer, each of said plurality of additional shutters having a contracted configuration covering an additional portion of the framed area and an expanded configuration covering a greater additional portion of the framed area;

whereby, when a voltage is applied between said conductive layer and said further conductive layer of each of said additional shutters, a potential difference between said conductive layer and said further conductive layers of each of said plurality of shutters causes said shutters to expand from said contracted configurations to said expanded configurations to control radiation transmittance through said insulated glazing unit.

19. The insulating glazing unit of claim 11, wherein said greater portion is substantially said entire framed area.

20. The insulating glazing unit of claim 11, wherein said first glazing pane is either plastic or glass and said second glazing pane is either plastic or glass.

* * * * *

UNITED STATES PATENT AND TRADEMARK OFFICE

CERTIFICATE OF CORRECTION

PATENT NO. : 8,035,075 B2
APPLICATION NO. : 12/655956
DATED : October 11, 2011
INVENTOR(S) : Elliott Schlam et al.

It is certified that error appears in the above-identified patent and that said Letters Patent is hereby corrected as shown below:

Column 6, lines 3 and 4, insert a -- - -- between the words “rolled out”
Column 6, line 22, delete the words “and entire length but not width of an IGU,”
Column 7, line 14, delete the initials “IOU” and insert the initials --IGU--
Column 7, line 17, delete the initials “IOU” and insert the initials --IGU--
Column 7, line 26, delete the initials “ICU” and insert the initials --IGU--
Column 7, line 28, delete the initials “ICU” and insert the initials --IGU--
Column 7, line 53, delete the “,” after “2*a*” and insert a --.--
Column 8, line 66, delete the first set of words “attached thereto”
Column 9, line 26, insert a --(-- before the first “as”
Column 13, line 15, delete the initials “IOU” and insert the initials --IGU--
Column 13, line 26, delete the initials “IOU” and insert the initials --IGU--

Signed and Sealed this
Twentieth Day of November, 2012

David J. Kappos
*Director of the United States Patent and Trademark Office*